US 6,584,834 B1

(12) United States Patent
Lehner et al.

(10) Patent No.: US 6,584,834 B1
(45) Date of Patent: Jul. 1, 2003

(54) METHOD FOR DETECTING COMBUSTION MISSES

(75) Inventors: Michael Lehner, Muehlacker (DE); Heiko Oertel, Stuttgart-Weilimdorf (DE); Andrea Lohmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 09/831,735
(22) PCT Filed: Sep. 21, 2000
(86) PCT No.: PCT/DE00/03285
§ 371 (c)(1), (2), (4) Date: May 14, 2001
(87) PCT Pub. No.: WO01/23735
PCT Pub. Date: Apr. 5, 2001

(30) Foreign Application Priority Data

Sep. 24, 1999 (DE) ......................... 199 45 811

(51) Int. Cl.$^7$ ............................. G01M 15/00
(52) U.S. Cl. .................... 73/116; 73/117.3
(58) Field of Search ................ 73/116, 117.3; 123/406.23, 406.14

(56) References Cited

FOREIGN PATENT DOCUMENTS

| JP | 61 229937 | 10/1986 |
|----|-----------|---------|
| JP | 01 083837 | 3/1989  |

*Primary Examiner*—Hezron Williams
*Assistant Examiner*—Takisha S Miller
(74) *Attorney, Agent, or Firm*—Walter Ottesen

(57) ABSTRACT

A method for detecting combustion misfires for internal combustion engines is introduced wherein an index for the rough running of the engine is formed and is compared to a threshold value. The threshold value is dependent upon the load of the engine. Exceeding the threshold value is evaluated as a misfire. The method is characterized in that the threshold value, in addition to being dependent upon the load, is also dependent upon the ignition angle and/or the lambda value or that the formation of the index for the rough running also takes place in dependence upon the ignition angle and/or on the lambda value; and/or that the activation/deactivation of the misfire detection is at least dependent upon the ignition angle and/or on the lambda value.

5 Claims, 5 Drawing Sheets

METHOD FOR DETECTING COMBUSTION MISSES

BACKGROUND OF THE INVENTION

A method for detecting combustion misfires is already known from U.S. Pat. No. 5,955,663 wherein an index for the rough running of the internal combustion engine is formed and is compared to a threshold value. The threshold value is dependent upon the load of the engine and exceeding the threshold value is evaluated as a misfire. The load, that is, essentially the charge of the cylinder with air influences the rough running significantly. With the torque, which increases with increasing load, the acceleration forces acting on the crankshaft increase and thereby effect an increasing rough running.

SUMMARY OF THE INVENTION

The task of the invention comprises a further improvement of the detection quality of the combustion misfires.

The solution considers that the rough running of the engine is dependent upon the torque of the engine for a regular combustion. In addition to load, which is essentially defined by the cylinder charge with air, the ignition angle and the air/fuel ratio of the cylinder charge also influence the torque resulting from the combustion of the cylinder charge and thereby the rough running which is to be expected under regular conditions.

The consideration of the ignition angle in accordance with the invention and/or of the air/fuel ratio of the cylinder charge in the determination of the threshold value or in the formation of an index for the rough running of the engine and/or for the activation/deactivation of the misfire detection permits a lesser spacing of threshold value and rough running values under regular conditions and therefore a more sensitive detection of the non-regular conditions, that is, especially of misfires.

The consideration in accordance with the invention of the ignition angle in modern internal combustion engine controls is of special advantage. The combustion engine controls use also the ignition angle as an actuating variable for realizing a requested torque in addition to the cylinder charge.

In contrast to other internal combustion engine controls, the comparatively rigid coupling of the ignition angle to load and rpm is unnecessary in these modern engine controls. The reduced dependency of the ignition angle on these quantities increases the inherent influence of the ignition angle on the torque and therefore the advantageous effects of the invention.

The composition of the air/fuel mixture additionally influences the torque. A further increase of the accuracy therefore results from a consideration of the composition of the air/fuel mixture.

In engines having gasoline direct injection, operating conditions are conceivable wherein the desired torque for a pregiven air charge and fixed optimal ignition angle is adjusted via the quality of the air/fuel mixture, that is, via the lambda value of the mixture.

In such operating conditions, it is therefore not the ignition angle but the composition of the air/fuel mixture which is the decisive quantity to be considered in accordance with the invention.

Furthermore, a supplemental consideration of the condition of a torque converter bridging clutch in vehicles having automatic transmissions is advantageous.

The drive train defines a system capable of oscillation. Depending upon whether the clutch is open or closed, there is also a different effect via attenuating or exciting influences on the rough running values of the engine. In this way, the disturbance spacing can be influenced, that is, the spacing of the rough running values under the influence of misfires from the rough-running values for regular combustion.

The supplemental consideration of the converter bridge coupling permits also here an optimization of the disturbance spacing.

The consideration of the ignition angle for the activation/deactivation of the combustion misfire detection leads to a further increased reliability of the combustion misfire detection.

BRIEF DESCRIPTION OF THE DRAWINGS

The invention will now be described with respect to the drawings wherein.

DESCRIPTION OF THE PREFERRED EMBODIMENTS OF THE INVENTION

Figure 1A:
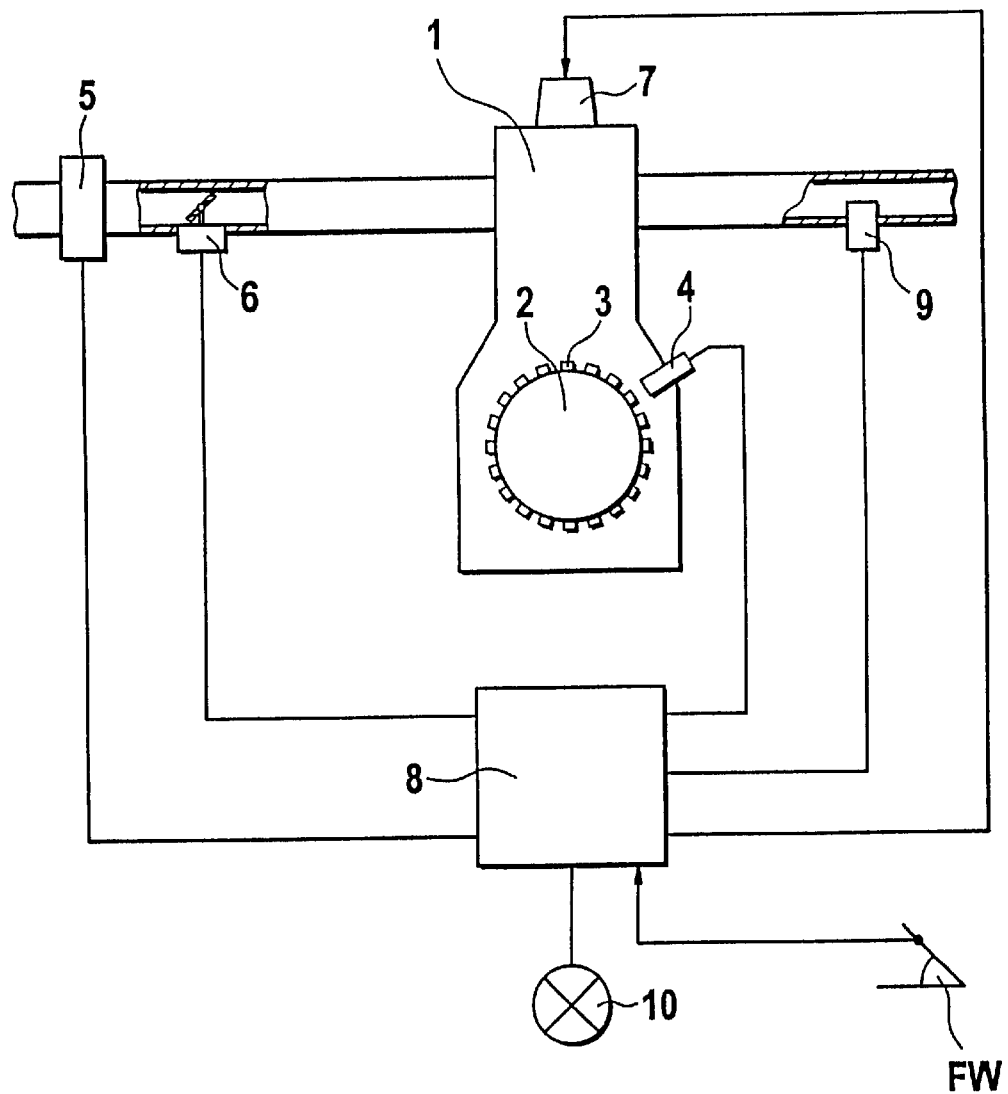
FIG. 1a shows the technical background of the invention.

FIG. 1 shows an internal combustion engine 1 having an angle transducer wheel 2 which carries markings 3 as well as an angle sensor 4, a device 5 for detecting the air quantity ml flowing into the engine, a power actuating member 6, an ignition device 7 and a control apparatus 8 as well as a fault lamp 10, an exhaust-gas sensor 9 and a device FW for detecting the torque wanted by the driver. The device 5 can, for example, be a hot-film air mass sensor and the power actuating member 6 can, for example, be an electronically controlled throttle flap.

The torque mdact of the engine can be determined from the detected operating data and from characteristic fields and characteristic lines stored in the control apparatus. The signal of the hot-film air mass sensor supplies a signal as to the air quantity which flows into the engine. Under steady-state conditions, the air charge rl of an individual cylinder can be determined by dividing this air quantity by the rpm and the number of the cylinders. The dependency of the torque mdact on the charge rl and rpm n for an optimal ignition angle value ZWOPT is stored for a stoichiometric mixture (lambda=1) in a characteristic field in the control apparatus.

The operating data rl, N are determined from the signals of the sensors 5 and 4. From these operating data rl, N, the torque mdact can, in principle, be determined. Deviations of the actual ignition angle ZW from the value ZWOPT and deviations of the actual lambda, which the sensor 9 supplies, influence the torque. These influences can be considered via predetermined corrective values in the computation of mdact.

The optimal ignition angle ZWOPT is likewise stored in a characteristic field in dependence upon rl and n.

The rotational movement of the angle transducer wheel, which is coupled to the crankshaft of the engine, is converted into an electrical signal whose periodicity defines an image of the periodic passing of the marks 3 at the angle sensor 4. This conversion takes place with the aid of the angle sensor 4 which is realized as an inductive sensor. The time duration between an increase and a drop of the signal level therefore corresponds to the time in which the crankshaft has rotated further through an angular range corresponding to the extent of a marking. These time durations are processed further in the control apparatus 8 to an index Lut for the rough running of the engine. The control apparatus 8 is realized as a computer.

An example of a Lut computation is presented hereinafter.

The rpm n of the crankshaft of the engine can also be determined from the signal of the sensor 4. The torque resulting from the combustion is decisively determined by: rpm n, inducted air quantity ml as an index for the cylinder charge rl of the engine as well as the air/fuel mixture composition lambda of the cylinder charge and the ignition angle ZW.

For adjusting the desired torque, the control apparatus processes the signals of the above-described sensors and, if required, the signals of still other sensors and forms the drive signals therefrom, especially for controlling charge via the power adjusting member 6 and, for supplementing the torque adjustment, via the ignition angle ZW with which the ignition device is driven.

Figure 1B:
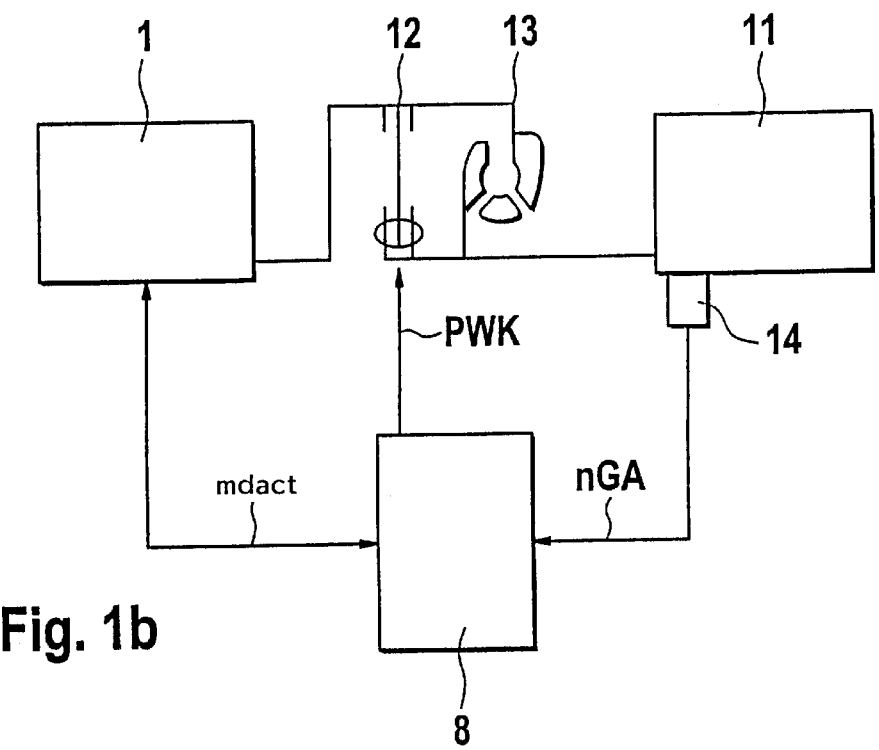
FIG. 1b is a schematic showing a converter bridge coupling mechanically bridging a hydraulic torque converter.

In addition to the engine 1 and the control apparatus 8, FIG. 1b shows an automatic transmission 11 having a hydraulic torque converter 13, a converter bridge coupling 12 and a sensor 14 for detecting the transmission output rpm nGA.

The converter bridge coupling functions to mechanically bridge the hydraulic torque converter. In the bridged condition, the slip of the hydraulic torque converter is eliminated and the efficiency of the force transmission is thereby improved. The control of the converter coupling takes place via the control apparatus 8 with a signal PWK in dependence upon the engine torque mdact or charge rl and transmission output rpm nGA. In the following, PWK=1 is intended to correspond to a closed converter bridge coupling.

Figure 2A:
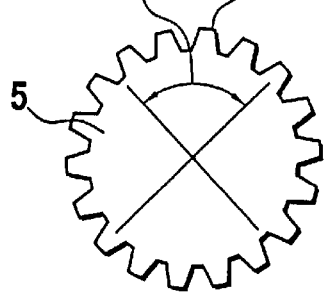
FIG. 2a shows an angle transducer wheel subdivided into four segments.

FIG. 2a shows a subdivision of the angle transducer wheel into four segments. Each segment has a specific number of markings. The marking OTk is assigned to that top dead center point of the piston movement of the k-th cylinder of an internal combustion engine which, in this example, is an eight cylinder engine. The top dead center point lies in the combustion stroke of this cylinder. An angular range φk is defined about this point and extends, in this example, over a quarter of the markings of the angle transducer wheel. In the same manner, angular ranges φ1 to φ8 are assigned to the combustion strokes of the remaining cylinders. Here, a four-stroke principle is presumed wherein the crankshaft rotates twice for a complete work cycle. For this reason, the range φ1 of the first cylinder, for example, corresponds to the range φ5 of the fifth cylinder, et cetera. The angular ranges, which correspond to a crankshaft rotation, can be separate from each other or can extend one into the other or even overlap. In the first case, markings are provided which are assigned to no angular range and, in the second case, each marking corresponds precisely to an angular range and, in the third case, the same markings can be assigned to different angular ranges. Desired lengths and positions of the angular ranges are thereby-possible.

Figure 2B:
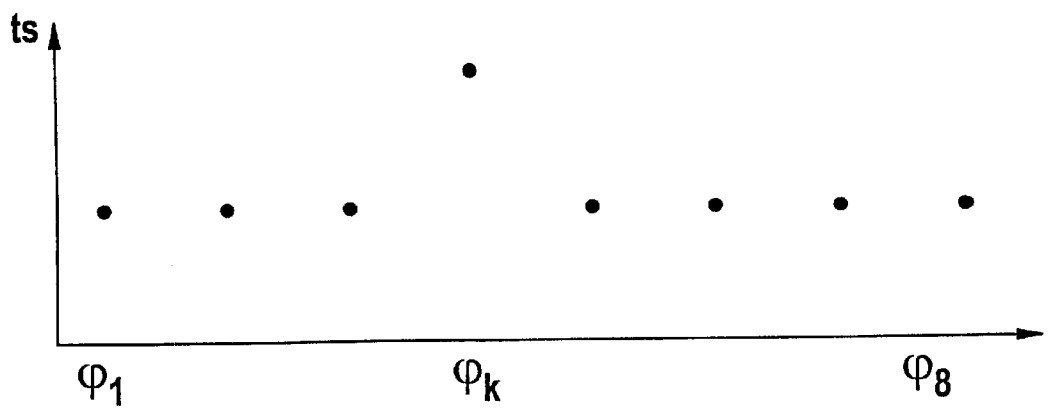
FIG. 2b is a graph showing segment time plotted as a function of angular range.

In FIG. 2b, times ts are plotted wherein the angular ranges are passed through by the rotational movement of the crankshaft. Here, a misfire in the cylinder k is assumed. The absence of torque connected to the misfire leads to increase of the corresponding time span ts or to an increase of a subsequent time span ts+1. The time spans ts thereby define an index for the rough running which, in principle, is suitable for detecting misfires. The rough running value receives the dimension of an acceleration and exhibits an improved signal/noise ratio via a suitable processing of the time spans ts (especially via the formation of differences of adjacent time spans and the standardization of these differences to the third power of the time span tsi at an ignition stroke having index i).

The rough-running values can also be formed in accordance with other procedures.

Figure 3A:
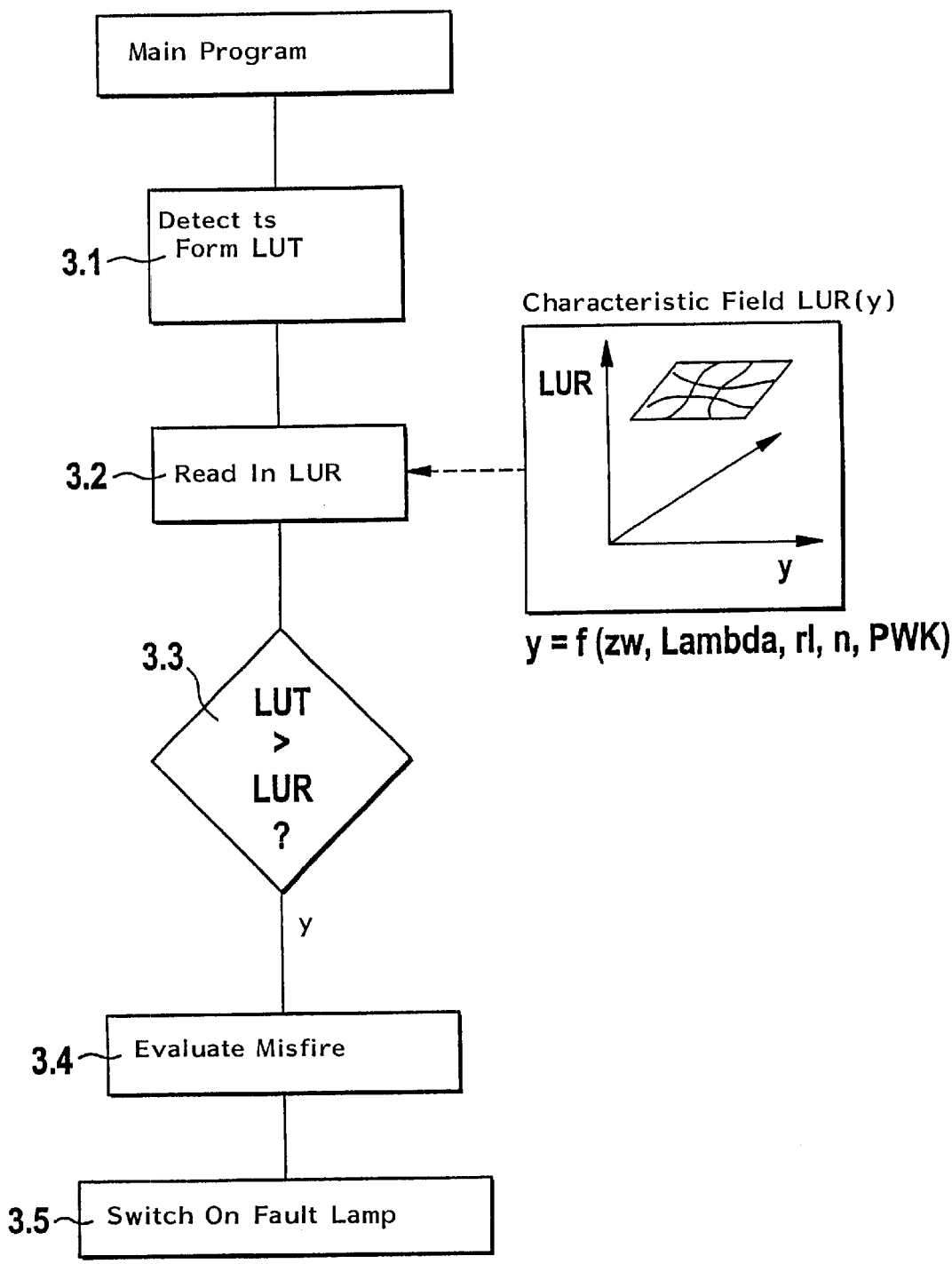
FIG. 3a is a flowchart showing an embodiment of the method of the invention for detecting combustion misfires.

The sequence of a misfire detection is shown in FIG. 3a which is presented as a flowchart of an embodiment of the method of the invention.

The embodiment is called up cyclically from a higher order engine control program or main program.

The misfire detection method starts with step 3.1 wherein the ignition-synchronous segment times are detected and, if required, processed to rough-running values.

In step 3.2, a threshold value LUR is read in from a characteristic field LUR(y). At least the ignition angle ZW serves as an input parameter y of the characteristic field. As other input parameters, the mixture composition lambda, the charge rl, the rpm n and the state PWK of the converter bridge coupling can be considered individually or in desired combinations. Here, a closed converter bridge coupling (PWK=1) tends to be coupled to a higher threshold value. The same applies for higher values of rl. Deviations of the ignition angle ZW from an optimal value lead to lower torques. Correspondingly, the threshold value drops with increasing spacing of ZW from ZWOPT. The same applies for lambda values deviating from lambda=1.

After reading in the threshold value LUR, a comparison of the rough-running value to the threshold value takes place in step 3.3. In step 3.4, a crossover of the threshold value by a rough-running value is evaluated as a misfire. Step 3.5 follows thereon, wherein, if required, a fault lamp MIL is switched on, that is, for example, for a specific frequency of occurrence of misfires.

Figure 3B:
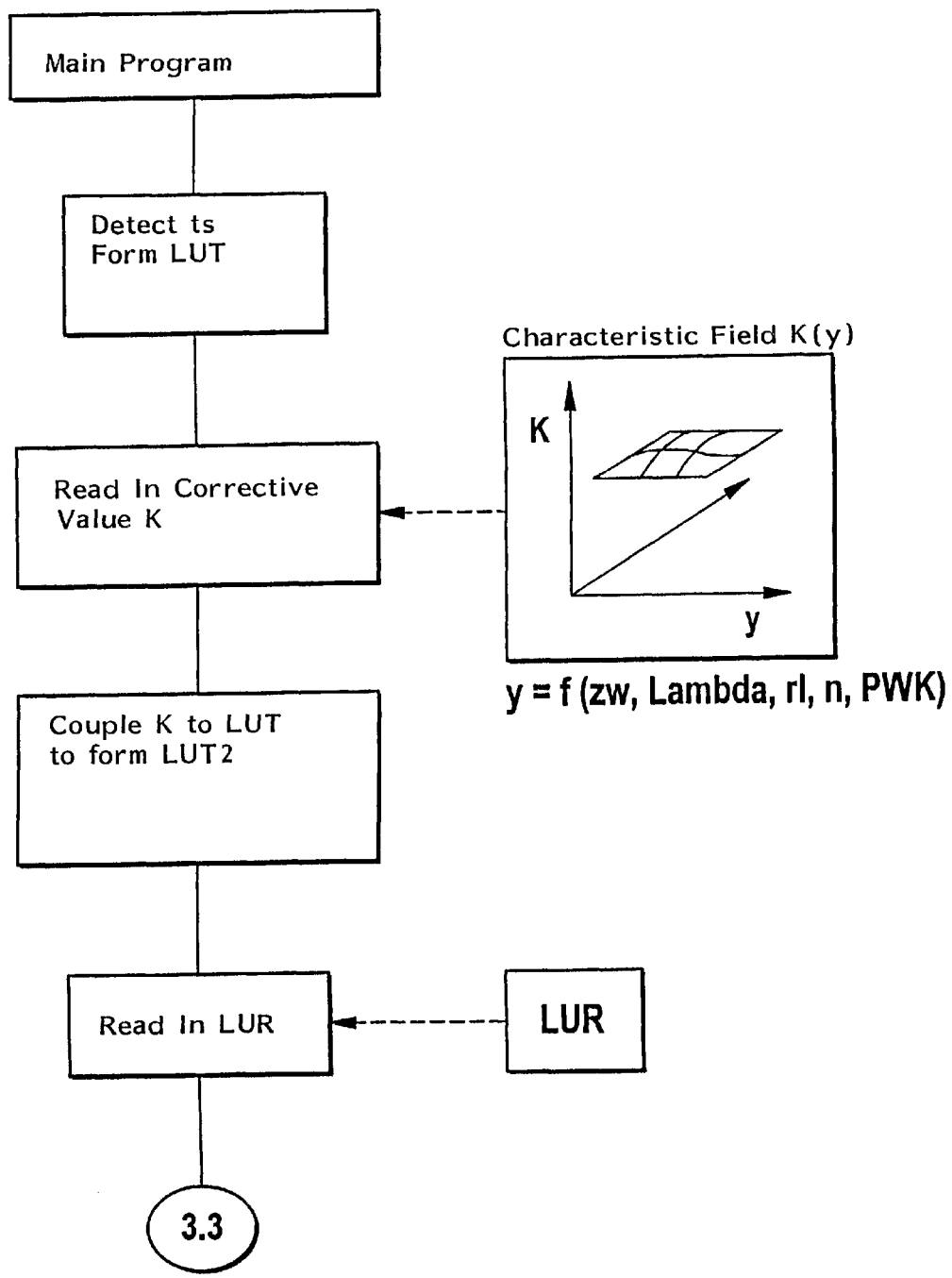
FIG. 3b is a flowchart showing another embodiment of the method of the invention.

FIG. 3b shows an alternative for changing the threshold value. In the context of this alternative, a change of the rough-running values takes place in lieu of a change of the threshold value. For this purpose, a corrective value K is read in from a characteristic field in step 3.1.1 and, in step 3.1.2, the corrective value K is logically coupled to an uncorrected rough-running value LUT to form a corrected rough-running value LUT2. The logic coupling can be additive or multiplicative. For a closed converter bridge coupling (PWK=1), the correction operates on the rough-running values so as to tend to be reducing. In this way, the misfire detection is more insensitive to drive train fluctuations. The same applies for higher values of rl which increase the torque and therefore the rough running without the increased rough running (uncorrected) being caused by misfires. Deviations of the ignition angle ZW from its optimal value lead to lower torques. In this case, the correction correspondingly operates with an increasing spacing of ZW from ZWOPT. The same applies for lambda values deviating from lambda=1.

The threshold value read in in step 3.2 can be constant in this embodiment so that the characteristic field shown in FIG. 3a reduces to a certain extent to a storage cell.

FIG. 4 shows a further embodiment which further increases the reliability of the misfire detection.

Figure 4A:
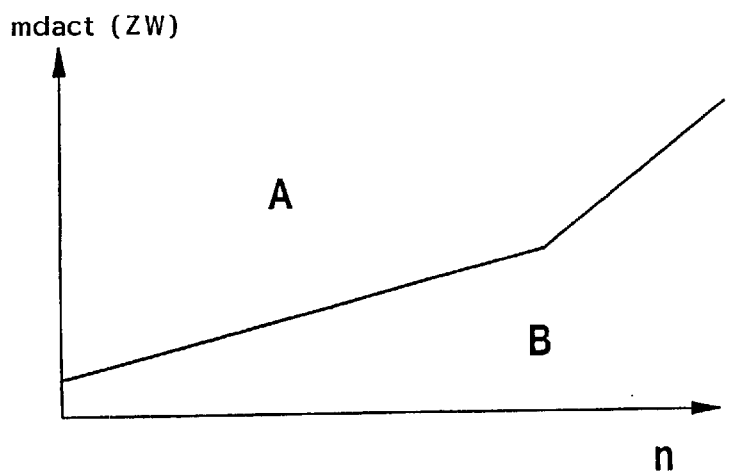
FIG. 4a is a characteristic field spanning torque and engine speed.

FIG. 4a shows a characteristic field spanning torque mdact and rpm n wherein regions A and B are distinguished.

Figure 4B:
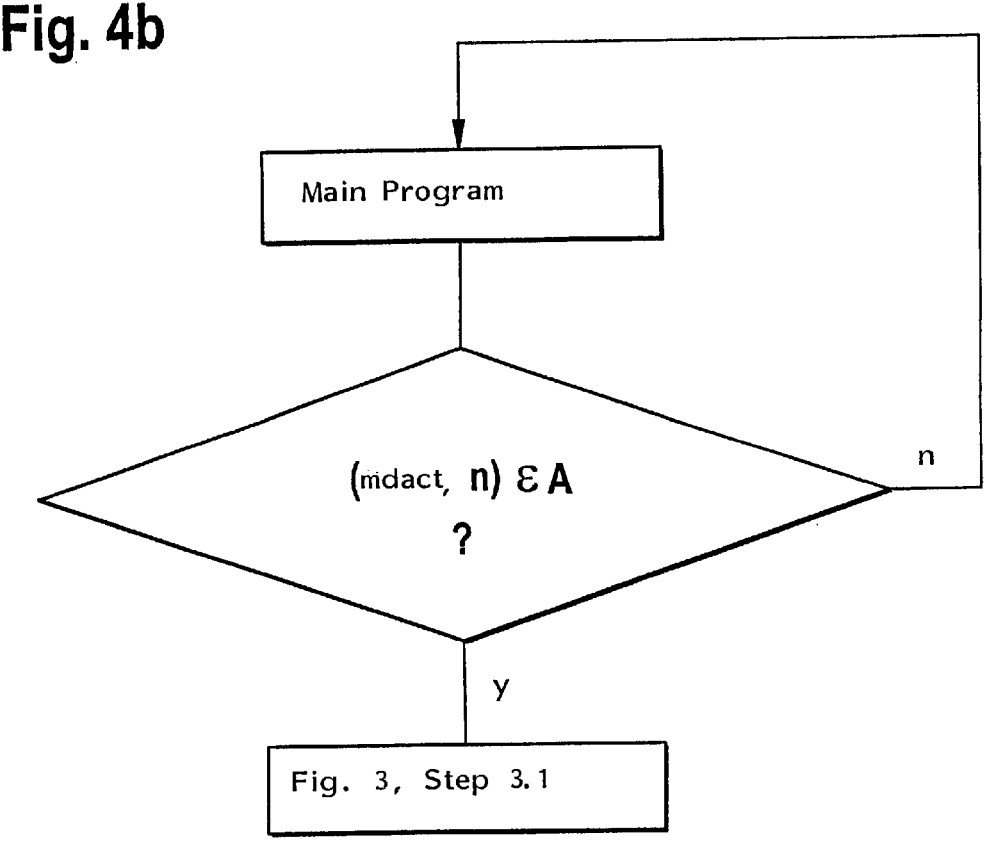
FIG. 4b is a flowchart showing an additional inquiry positioned in advance of the misfire detection of FIGS. 3a and 3b.

FIG. 4b, with step 4.1, shows an additional inquiry positioned in advance of the misfire detection of FIG. 3.

Here, a check is made as to whether the actual value pair mdact(ZW), n lies in region A. If this is answered in the affirmative, the misfire detection of FIG. 3 takes place. Stated otherwise, the misfire detection is activated. If, in contrast, the inquiry is answered in the negative, then there is a return into the main program without the misfire detection being activated.

The work region A is dependent upon the torque and the rpm. Via this work region A, in which the misfire detection is active, the misfire detection can be deactivated especially at operating points having large charge while simultaneously having a large spacing of the ignition angle ZW from an optimal value ZWOPT.

These operating points are typically adjusted for heating the catalytic converter. The efficiency of the engine is reduced because of the non-optimal ignition time point. The energy of the cylinder charge, which is not released in the engine because of the reduced efficiency, heats the catalytic converter connected downstream. The poor efficiency is compensated by an increased charge.

The increased charge alone could be interpreted as an index for an adequate disturbance spacing because the increased charge is accompanied at other operating points with increased torque. However, this correlation does not apply in special operating points having deteriorated efficiency. The torque is lower because of the lower efficiency. The consideration of the ignition angle in accordance with the invention and, if required, also the mixture composition permits an improved suppression of critical operating points and therefore, overall, an increase of the reliability of the misfire detection.

What is claimed is:

1. A method for detecting combustion misfires in an internal combustion engine wherein an index for the rough running of the engine is formed and is compared to a threshold value which is dependent upon the load of the engine and wherein exceeding the threshold value is evaluated as a misfire and the detection of combustion misfires can be activated or deactivated, the method comprising the step of providing at least one of the following:

(a) that, in addition to the dependency upon the load, the threshold value is also dependent upon at least one of the ignition angle and the composition of the air/fuel mixture of the engine;

(b) that the formation of the index for the rough running also takes place in dependence upon at least one of the ignition angle and the composition of the air/fuel mixture of the engine; and, (c) that whether the misfire detection is activated or deactivated is at least dependent upon at least one of the ignition angle and the composition of the air/fuel mixture of the engine.

2. The method of claim 1, wherein a value mdact is determined for the torque developed by the engine while considering load, ignition angle, and, if required, also the composition of the air/fuel mixture; and, wherein one of the threshold value and the formation of the index for the rough running takes place in dependence upon the value mdact for the torque developed by the engine.

3. The method of claim 1, wherein the method comprises the further step of making a determination as to whether the method for detecting combustion misfires is activated or deactivated in dependence upon one of the following: rpm and load; rpm, load and ignition angle; and, rpm, load, ignition angle and the composition of the air/fuel mixture.

4. The method of claim 1, wherein, for a vehicle having an automatic transmission and an upstream connected hydrodynamic torque converter having a converter bridge coupling switchable between at least a first switching state and a second switching state, the switching state of the converter bridge coupling is considered for one of the following: the formation of the threshold value; and, the formation of the index for the rough running.

5. An electronic diagnostic apparatus for detecting combustion misfires in an internal combustion engine which runs rough in response to said combustion misfires, the apparatus comprising:

means for forming an index for the rough running of the engine;

means for comparing said index to a threshold value, which is dependent upon the load of the engine, with exceeding said threshold value being evaluated as a misfire; and, means for providing at least one of the following:

(a) forming the threshold value in addition to the dependency upon load also in dependence upon at least one of the following: the ignition angle and the composition of the air/fuel mixture of the engine;

(b) designing the formation of the index for the rough running also in dependence upon at least one of the ignition angle and the composition of the air/fuel mixture;

(c) designing an activation or deactivation of the misfire detection at least in dependence upon at least one of the ignition angle and the composition of the air/fuel mixture of the engine.

* * * * *